(12) United States Patent
Huang et al.

(10) Patent No.: US 12,221,351 B2
(45) Date of Patent: Feb. 11, 2025

(54) SILICENE QUANTUM DOTS-CONTAINING SILOXENE AND PREPARATION METHOD THEREFOR

(71) Applicant: ZHEJIANG UNIVERSITY, Hangzhou (CN)

(72) Inventors: Jingyun Huang, Hangzhou (CN); Xinling Xu, Hangzhou (CN); Liping Zhou, Hangzhou (CN); Zhizhen Ye, Hangzhou (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 624 days.

(21) Appl. No.: 17/581,872

(22) Filed: Jan. 22, 2022

(65) Prior Publication Data

US 2022/0185680 A1 Jun. 16, 2022

Related U.S. Application Data

(63) Continuation of application No. PCT/CN2019/103779, filed on Aug. 30, 2019.

(51) Int. Cl.
 *C01B 33/021* (2006.01)
 *B82Y 30/00* (2011.01)
 (Continued)

(52) U.S. Cl.
 CPC ............ *C01B 33/021* (2013.01); *C09K 11/59* (2013.01); *B82Y 20/00* (2013.01); *B82Y 30/00* (2013.01);
 (Continued)

(58) Field of Classification Search
 CPC ....... C01B 33/021; C01B 33/04; C09K 11/59; B72Y 20/00; B82Y 30/00; B82Y 40/00;
 (Continued)

(56) References Cited

FOREIGN PATENT DOCUMENTS

| CN | 103787319 A | 5/2014 |
|---|---|---|
| JP | 2009185090 A | 8/2009 |

OTHER PUBLICATIONS

Lin, Han, et al. "Silicene: wet-chemical exfoliation synthesis and biodegradable tumor nanomedicine." Advanced Materials 31.37 (2019): 1903013.*

(Continued)

*Primary Examiner* — Richard M Rump
(74) *Attorney, Agent, or Firm* — Valet Patent Service Limited

(57) ABSTRACT

Provided are a silicene quantum dots-containing siloxene thin film and a preparation method therefor, which belong to the field of fluorescent functional nanomaterials. A siloxene thin film embedded with silicene quantum dots is prepared by uniformly mixing $CaSi_2$ with a decalcification organic solvent and a transition metal chloride catalyst in a proportion, performing acid washing, and then performing ultrasonic dispersion. The thickness of such siloxene thin film is less than 1 to 2.5 nm, the size of the silicene quantum dots is 2 to 5 nm. In addition, the siloxene thin film has strong fluorescence emission performance in a blue light region, has a pseudodirect band gap, and shows a good application prospect in the fields of photoelectricity and the like.

18 Claims, 5 Drawing Sheets

(51) Int. Cl.
  *B82Y 40/00*     (2011.01)
  *C09K 11/59*    (2006.01)
  *B82Y 20/00*     (2011.01)

(52) U.S. Cl.
  CPC ........... *B82Y 40/00* (2013.01); *C01P 2004/03* (2013.01); *C01P 2004/04* (2013.01); *C01P 2004/64* (2013.01); *C01P 2006/60* (2013.01)

(58) Field of Classification Search
  CPC .............. C01P 2004/03; C01P 2004/04; C01P 2004/64; C01P 2006/60
  See application file for complete search history.

(56) References Cited

OTHER PUBLICATIONS

International Search Report (PCT/CN2019/103779); Date of Mailing: May 28, 2020.

Hideyuki Nakano, Masahiko Ishii and Hiroshi Nakamura, Preparation and structure of novel siloxene hanosheets, The Royal Society of Chemistry 2005, Received (in Cambridge, UK) Jan. 19, 2005, Accepted Apr. 14, 2005, First published as an Advance Article on the web Apr. 29, 2005.

Peiguang Hu, Limei Chen, Jia-En Lu, Hsiau-Wei Lee, and Shaowei Chen, Silicene Quantum Dots: Synthesis, Spectroscopy, and Electrochemical Studies, Langmuir 2018, 34, 2834-2840, Published: Feb. 3, 2018, California 95064, United States.

\* cited by examiner

SILICENE QUANTUM DOTS-CONTAINING SILOXENE AND PREPARATION METHOD THEREFOR

TECHNICAL FIELD

The present application belongs to the technical field of preparation of fluorescent functional nanofilm materials, and specifically relates to a silicene quantum dots-containing siloxene and a preparation method therefor.

BACKGROUND

Two-dimensional silicon-based materials have unique physical and chemical properties due to their high specific surface area and quantum confinement effect. Silicene is a 2D silicon allotrope with a unique low buckling structure. The oxide of silicene is siloxene. Silicene and siloxene have unique physical and chemical properties due to their high specific surface area and quantum confinement effect. Similar to graphene, silicene also has a hexagonal honeycomb structure. Since Si and C belong to the same family in the chemical periodic table, silicene and graphene have similar electronic properties. However, the Si atoms in silicene are not all $SP^2$ hybridized, but are in a status between $SP^2$ hybridization and $SP^3$ hybridization, causing its hexagons to have a buckling structure and a highly chemically active surface, which make it possible to control the band gap and realize the functionalization of chemical functional groups in silicene. Therefore, more and more attention is paid to the research of nano-silicene and its oxides. It is worth noting that silicene quantum dots, that are similar to graphene quantum dots, have great potential for a wide range of applications, such as biological imaging, chemical sensing, catalysis, drug delivery, light emission, and microelectronics. Therefore, it is of great significance to study the preparation methods, properties and potential applications of silicene quantum dots.

At present, the preparation methods of silicene and siloxene typically include epitaxial growth and chemical methods. Among them, the epitaxial growth method typically comprises growing a single- or multi-layer of silicene on Ag (111), Ir (111), $MoS_2$ or other substrates using a molecular beam epitaxy (MBE) method; and the chemical methods can be typically divided into chemical vapor deposition method, template method and liquid-phase exfoliation method. Despite the capability of controlled growth of a single layer of silicene, the epitaxial growth method is costly, complicated to operate, and difficult to separate the silicene from the substrate, which limits the research of various properties of the silicene and its application to a certain extent. Most of the chemical methods that have been reported are cumbersome, the thickness of the prepared material is relatively thick, and the yield is low. The principle of the method used in the present application is an optimized liquid-phase exfoliation method, which has simple operation, low cost, low toxicity of the raw materials used, and is more suitable for mass production.

At present, there are few studies on the photoluminescence properties of silicene quantum dots and siloxene. Unlike bulk silicon with indirect band gap, silicene has a pseudodirect band gap. Therefore, the study on the photoluminescence properties, energy band structure and luminescence lifetime of silicene quantum dots and siloxene is of great significance to their future applications in the fields of photoelectricity, sensors, microelectronics and the like.

SUMMARY

The object of the present application is to provide a silicene quantum dots-containing siloxene and a preparation method therefor in the technical field of nanomaterial preparation. The method comprises the top-down preparation of a silicene quantum dots-containing siloxene thin film through liquid-phase exfoliation of $CaSi_2$ at room temperature. The method utilizes transition metal chloride as a catalyst, which not only facilitates the layered exfoliation of $CaSi_2$ and increases the yield of the siloxene thin film, but also promotes the formation of silicene quantum dots on the silicon-enriched area of the siloxene surface. The prepared silicene quantum dots-containing siloxene nanofilm has strong blue fluorescence emission performance, nanosecond-level fluorescence lifetime and tunable broad-spectrum emission, and belongs to a semiconductor material having a pseudodirect band gap.

The present application provides a silicene quantum dots-containing siloxene and a preparation method therefor, comprising the following steps:

(1) uniformly mixing $CaSi_2$, a decalcification organic solvent and a transition metal chloride catalyst, to obtain a mixed solution after fully reacting and decalcifying;

(2) transferring the mixed solution obtained in the step (1) to a centrifuge tube, removing the supernatant after high-speed centrifugation, and then adding excess hydrochloric acid to remove metal compound impurities, to obtain a mixed liquor; and (3) repeatedly washing the mixed liquor obtained in the step (2) for several times by high-speed centrifugation with absolute ethanol, then adding absolute ethanol for ultrasonic dispersion, then collecting the supernatant after low-speed centrifugation, and vacuum drying the supernatant to obtain a silicene quantum dots-containing siloxene nanofilm.

In the step (1), the decalcification organic solvent is at least one of tetraethyl orthosilicate, ethyl acetate, isopropanol, and absolute ethanol; and the transition metal chloride catalyst is at least one of ferric chloride, cobalt chloride, and nickel chloride.

In the step (1), the molar ratio of $CaSi_2$ to the transition metal chloride catalyst is 1:1 to 1:4.

In the step (1), the reaction is to stand for 24 to 48 h at room temperature.

The high-speed centrifugation described in the method comprises a rotation speed of 10000 rpm or above and a centrifugation time of 10-15 min.

In the step (2), the concentration of the hydrochloric acid is 1-4 mol/L, the reaction duration is 3-7 h, and the molar ratio of the added hydrochloric acid to all the added metal elements is greater than 2.

In the step (3), the washing with absolute ethanol is performed for 3 to 5 times.

In the step (3), the low-speed centrifugation comprises a rotation speed of 200-500 rpm and a centrifugation time of 3-5 min.

In the step (3), the vacuum drying is performed under a temperature 60-80° C. for more than 24 h.

The present application provides a top-down preparation of a silicene quantum dots-containing siloxene through a liquid-phase exfoliation method. The siloxene thin film prepared by this method comprises silicene quantum dots thereon, the silicene quantum dots have a diameter of about 2-5 nm, and the siloxene thin film has a thickness of 1 to 2.5 nm and belongs to a two-dimensional nanomaterial with a thickness of 5 atomic layers. In the present application, for the first time, silicene quantum dots are formed by self-organized growth on siloxene through catalysis of a transition metal chloride. The siloxane has tunable broad-spectrum emission, and exhibits strong blue emission under the excitation of ultraviolet light. Moreover, the appearance of pseudodirect band gap transitions was observed through absorption spectroscopy and PL spectroscopy, which is very important for the research in silicon optoelectronics.

DETAILED DESCRIPTION

Figure 1:
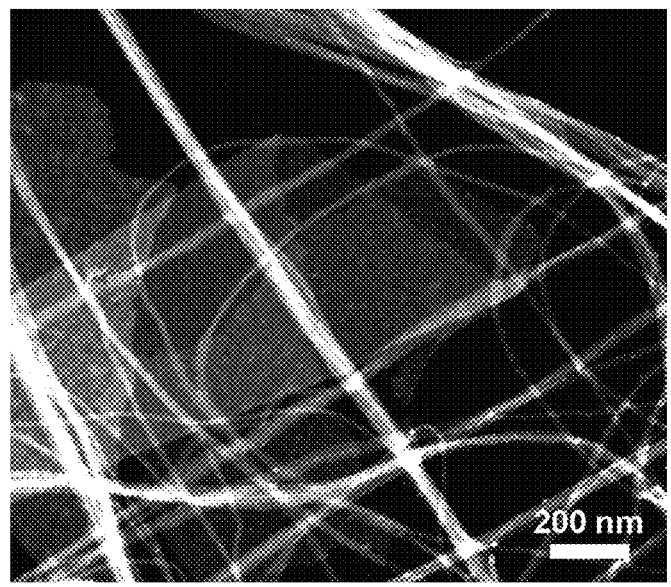
FIG. 1 is a STEM image of the silicene quantum dots-containing siloxene thin film prepared in Example 1.

In order to make the objectives, technical solutions, and advantages of the present application clearer, the following further describes the present application in detail with reference to the accompanying drawings and examples. It should be understood that the specific examples described herein are only used to explain the present application, but not to limit the present application. In addition, the technical features involved in the various embodiments of the present application described below can be combined as long as they do not conflict with each other.

Example 1

Provided herein is a method for preparing a silicene quantum dots-containing siloxene, comprising the following steps:

(1) weighing 0.54 g of ferric chloride hexahydrate, and adding 20 ml of ethyl acetate for full dissolution with agitation to obain a mixed solution.

(2) weighing 0.2 g of $CaSi_2$ into the mixed solution in (1), standing in a fume hood for 24 h for full reaction.

(3) after the reaction, transferring the resultant mixed solution to a centrifuge tube, and performing centrifugation with a centrifugation speed of 10000 rpm and a centrifugation time of 10 min.

(4) after centrifugation, collecting the lower sediment, adding 25 ml of 2 mol/L hydrochloric acid, and standing for 3 h in a fume hood after mixing uniformly by agitation, to dissolve remaining metal oxides and other impurities in the reaction product.

(5) after the reaction, transferring the resultant mixed solution to a centrifuge tube, performing centrifugation with a centrifugation speed of 10000 rpm and a centrifugation time of 10 min, aspirating and discarding the supernatant after centrifugation, adding 20 ml of absolute ethanol to wash the lower sediment with agitation, then performing centrifugation with the same parameters and discarding the supernatant, and after repeating the above procedures for 3 times, adding 20 ml of absolute ethanol to disperse the lower sediment.

(6) dispersing the mixed liquor by ultrasonic dispersion with 100% ultrasonic power for 2 h, to disperse and exfoliate more nanofilm samples.

(7) after completing the ultrasonic dispersion, transferring the mixed solution to a centrifuge tube, performing centrifugation with a centrifugation speed of 300 rpm and a centrifugation time of 3 min, collecting the upper liquid by aspiration after centrifugation and vacuum drying at 60° C. for 24 h, to obtain the silicene quantum dots-containing siloxene thin film as a powder sample, wherein a part of the upper liquid sample was retained for subsequent analysis and testing, and after removing the upper liquid, the lower sediment was used for subsequent morphology study on liquid-phase exfoliation of $CaSi_2$.

Example 2

The same steps as in Example 1 were used to prepare the silicene quantum dots-containing siloxene, except that the ethyl acetate in Example 1 was replaced with 20 ml of absolute ethanol. Other reaction conditions remained unchanged.

TEM characterization shows that the thickness and size of the silicene quantum dots are relatively large, with an average diameter of about 8 nm, and their structure is closer to crystalline silicon quantum dots rather than silicene quantum dots. The sample has an obvious absorption peak of crystalline silicon in the ultraviolet-visible absorption spectrum, and the photoluminescence spectrum results show that the sample has fluorescence emission in the blue light wavelength band under the excitation of ultraviolet light, but the intensity is less than that of the sample of Example 1.

Example 3

The same steps as in Example 1 were used to prepare the silicene quantum dots-containing siloxene, except that the ferric chloride hexahydrate in Example 1 was replaced with 0.48 g of cobalt chloride hexahydrate. Other reaction conditions remained unchanged.

TEM characterization shows that the siloxene thin film is relatively thick, but the silicene quantum dots have a low yield, an average diameter of about 3 nm and low crystallinity, and are closer to the silicon atom-enriched aggregation area. The sample has a weak absorption peak of crystalline silicon in the ultraviolet-visible absorption spectrum, and the photoluminescence spectrum results show that the sample has fluorescence emission in the blue-green light wavelength band under the excitation of ultraviolet light, which is the result of the combined action of the silicene quantum dots and the siloxene thin film.

Example 4

Characterization and Analysis of Transmission Electron Microscopy (TEM)

Figure 2:
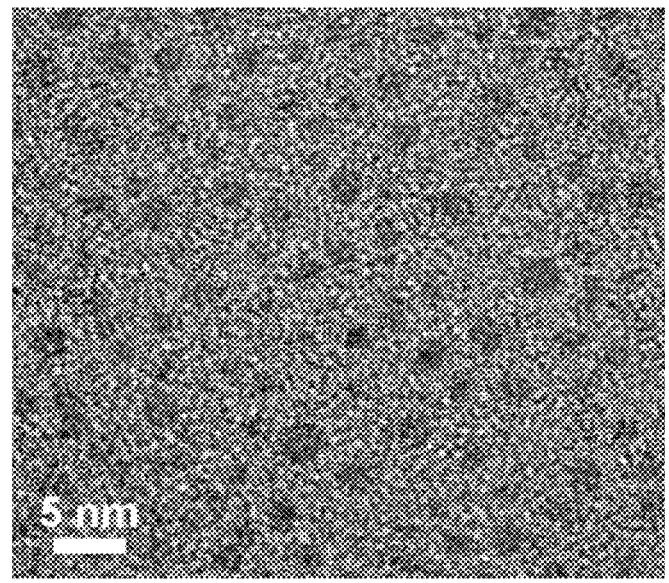
FIG. 2 is a HRTEM image of the silicene quantum dots-containing siloxene thin film prepared in Example 1.
Figure 3:
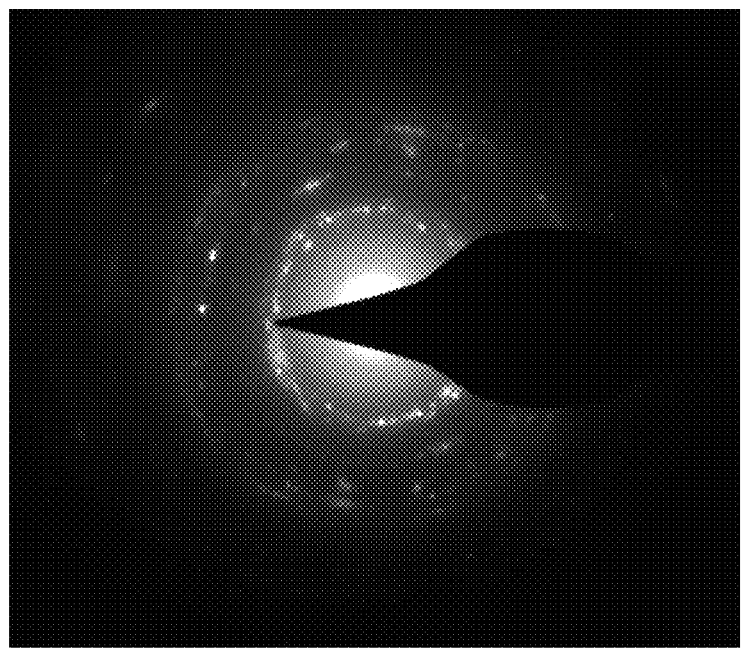
FIG. 3 is a selected area electron diffraction (SAED) pattern image of the corresponding area in FIG. 2.

Transmission electron microscope was used to determine the size, quantum dot distribution, and crystallinity of the silicene quantum dots-containing siloxene thin film. FIG. 1 is a scanning transmission electron microscopy (STEM) image of the sample, showing that the siloxene thin film has an extremely thin thickness, a certain degree of flexibility, and a large size. FIG. 2 is a high resolution transmission electron microscopy (HRTEM) image of the silicene quantum dots-containing siloxene thin film, showing that the silicene quantum dots are uniformly distributed on the siloxene thin film and have a size of about 2 to 5 nm, which is corresponded to their blue light emission property. FIG. 3 is the selected area electron diffraction pattern image corresponding to an area in FIG. 2, showing that the prepared silicene quantum dots belong to a polycrystalline. After calibration, the crystal structure corresponding to the diffraction pattern corresponds to silicene, and its lattice fringe spacing is 2.1 Å, proving that the prepared quantum dots are silicene quantum dots different from silicon crystal quantum dots.

Example 5

Characterization and Analysis of Scanning Electron Microscopy (SEM)

Figure 4:
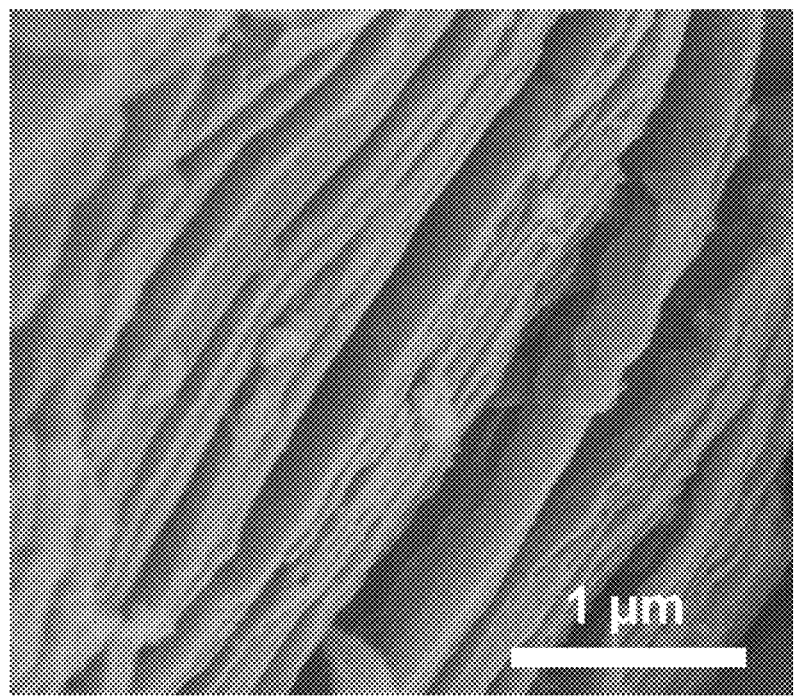
FIG. 4 is an SEM image of the layered sample after the liquid-phase exfoliation of $CaSi_2$ in Example 1.

Scanning electron microscope was used to observe the changes in the morphology of $CaSi_2$ in the lower sediment after sample preparation. FIG. 4 is the SEM image of the layered sample after the liquid-phase exfoliation of $CaSi_2$, showing that the $CaSi_2$ after the reaction has obvious layered exfoliation, indicating that the calcium ions in the $CaSi_2$ were extracted under the combined action of the decalcification solvent and the transition metal chloride catalyst, leaving silicon atoms to form a siloxene thin film, on which silicene quantum dots were formed by self-organized growth.

Example 6

Characterization and Analysis of Atomic Force Microscopy (AFM)

Figure 5:
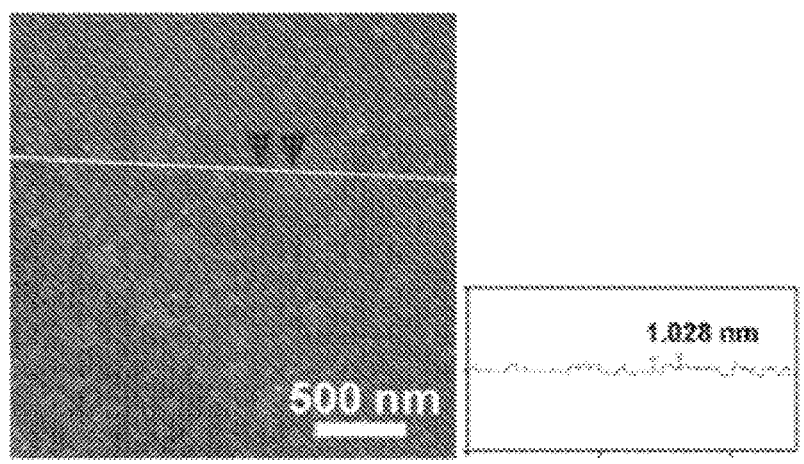
FIG. 5 is an AFM image and thickness characterization of the silicene quantum dots-containing siloxene thin film prepared in Example 1.

Atomic force microscope was used to determine the thickness of the silicene quantum dots-containing siloxene thin film. FIG. 5 is the AFM image of the sample dispersed on a mica sheet. The measurement shows that the thickness of the siloxene thin film is within 2 nm and its surface is distributed with uneven silicene quantum dots. According to calculation, the atomic layers of the siloxene and the silicene quantum dots are within 5 layers.

Example 7

Analysis of Ultraviolet-Visible Spectroscopy (UV-Vis)

Figure 6:
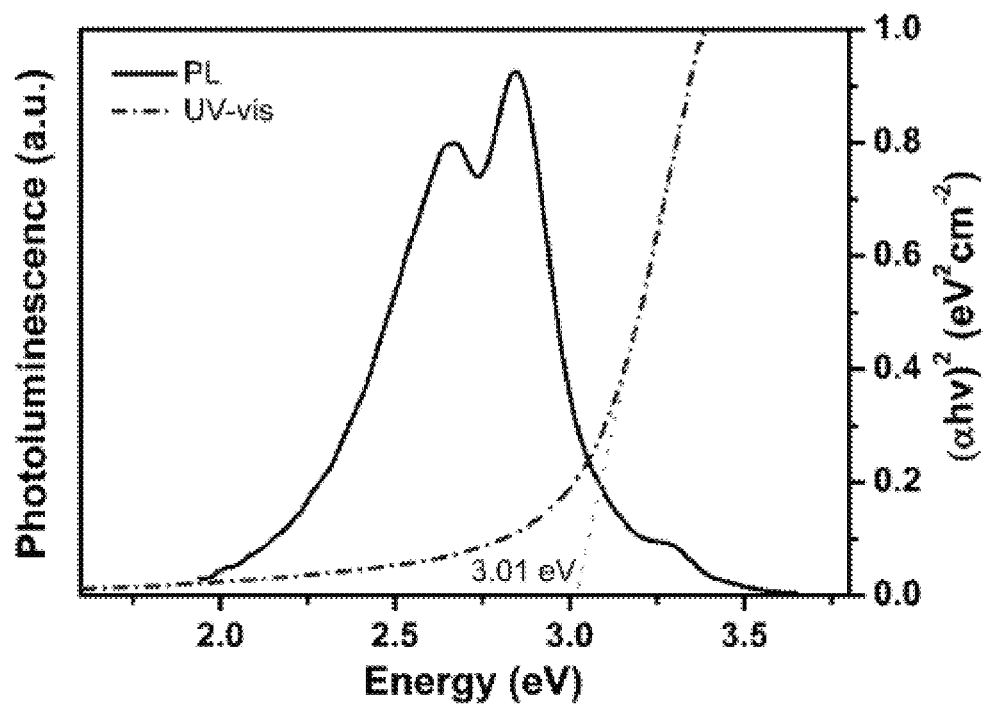
FIG. 6 is the ultraviolet visible absorption spectrum (UV-vis) and photoluminescence spectrum (PL) images of the silicene quantum dots-containing siloxene thin film prepared in Example 1, where the ultraviolet visible absorption spectrum has been converted into a data graph that can be used to calculate the optical band gap, and the abscissa of the photoluminescence spectrum is converted from wavelength (nm) to photon energy (eV)

Ultraviolet-visible spectrophotometer was used to analyze the light absorption capacity of the silicene quantum dots-containing siloxene thin film. After the absorption spectrum was obtained, its optical band gap was calculated after data processing. As shown in FIG. 6, the optical band gap of the sample is about 3.01 eV, and when excluding the interference from instrument error and test environment, the optical band gap corresponds to the fluorescence emission peak of the sample at 435 nm (excitation at 325 nm). The coefficient obtained by processing the ultraviolet-visible absorption spectrum data indicates that the sample belongs to a semiconductor having a direct band gap at that moment. Therefore, the sample underwent a pseudodirect band gap transition at 435 nm, which is due to the band gap change of the silicon material caused by the quantum confinement effect.

Example 8

Analysis of Photoluminescence (PL) Spectrum and Fluorescence Lifetime

Figure 7:
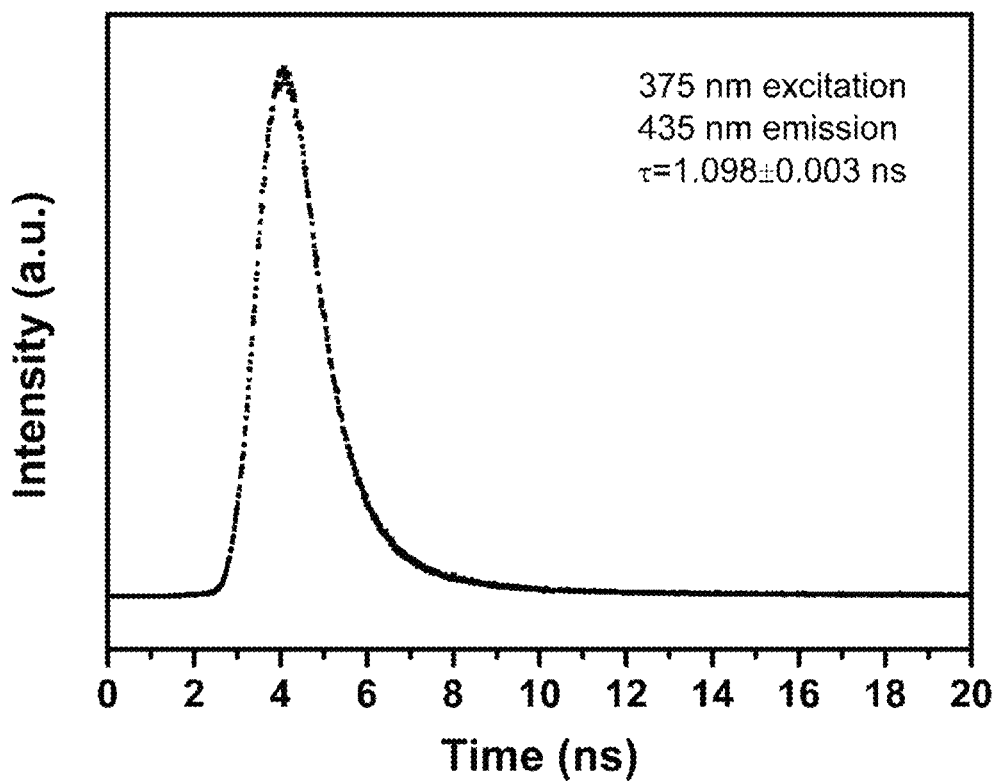
FIG. 7 is a fluorescence lifetime curve of the silicene quantum dots-containing siloxene thin film prepared in Example 1.

Fluorescence spectroscopy was used to perform photoluminescence testing and fluorescence lifetime analysis on samples. The photoluminescence spectrum image in FIG. 6 shows that under the excitation of 325 nm ultraviolet light, the sample has obvious blue light emission peaks at 435 nm and 465 nm, in which the luminescence peak at 435 nm is due to the band-edge transition of the silicene quantum dots, and the luminescence peak at 465 nm comprises not only the band-edge luminescence of the silicene quantum dots of different sizes, but also luminescence from luminescence centers, such as the oxygen defect-derived composite luminescence and surface state-derived luminescence of the siloxene thin film itself. FIG. 7 shows the fluorescence lifetime curve of the silicene quantum dots-containing siloxene thin film at the emission peak of 435 nm. The excitation light used in the test has a wavelength of 375 nm. The fluorescence lifetime of the sample is calculated to be about 1.098 ns after fitting, which corresponds to the fluorescence lifetime of the band-edge transition of the silicene quantum dots, and also indirectly proves that the sample belongs to a semiconductor having a pseudodirect band gap.

Figure 8:
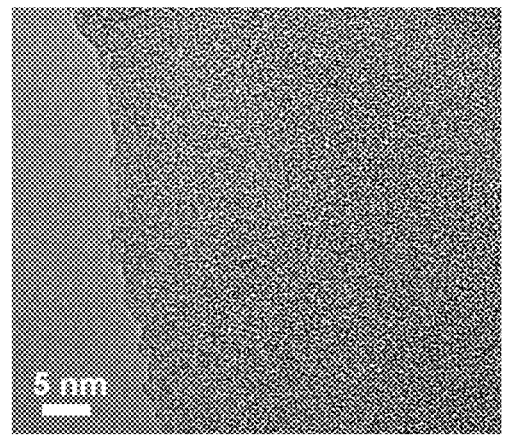
FIG. 8 is an HRTEM image of a siloxene thin film prepared by a conventional method.
Figure 9:
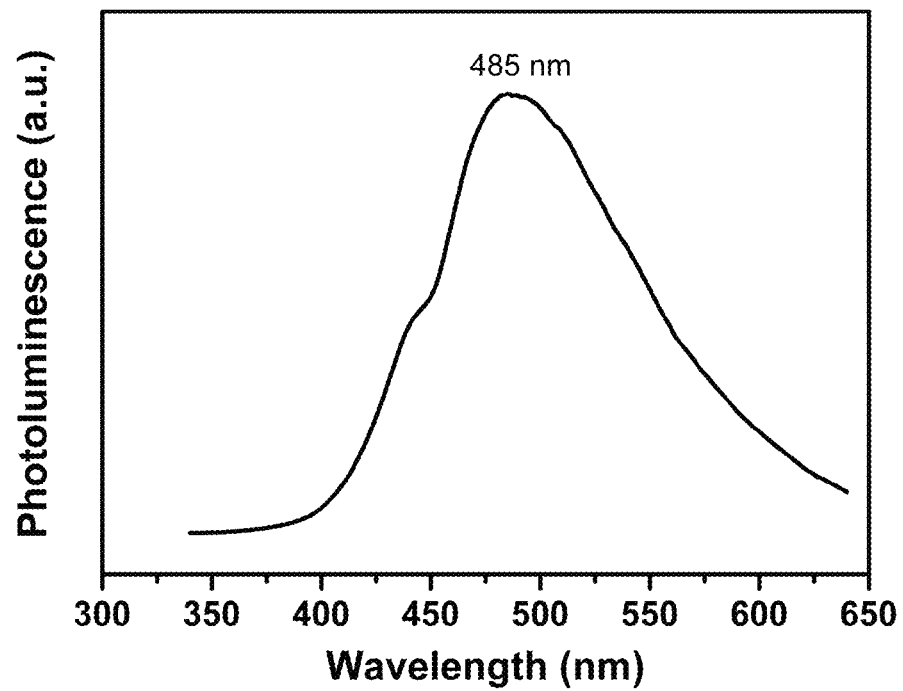
FIG. 9 is a photoluminescence spectrum image of a siloxene thin film prepared by a conventional method.

The siloxene thin film prepared by the improved liquid-phase exfoliation method of the present application has silicene quantum dots attributed to the use of organic solvents and the use of a transition metal chloride as catalyst. The luminescence property of the siloxene thin film can be adjusted to exhibit strong blue light emission (435 nm) under the excitation of ultraviolet light (325 nm). This is quite different from a siloxene thin film prepared by a conventional method. The conventional method differs from the method in Example 1 of the present application in that, the step (1) is omitted and the mixed solution in the step (2) is replaced with hydrochloric acid. As a result, the prepared siloxene thin film does not comprise silicene quantum dots (as shown in FIG. 8) and has a thickness of 1-2.5 nm, and an emission peak at 485 nm under the excitation of ultraviolet light (325 nm) (as shown in FIG. 9).

What is claimed is:

1. A method for preparing a silicene quantum dots-containing siloxene, comprising the following steps:
   (1) uniformly mixing $CaSi_2$, a decalcification organic solvent and a transition metal chloride catalyst, to obtain a mixed solution after fully reacting and decalcifying;
   (2) transferring the mixed solution obtained in the step (1) to a centrifuge tube, removing the supernatant after high-speed centrifugation, and then adding excess hydrochloric acid to remove metal compound impurities, to obtain a mixed liquor; and
   (3) repeatedly washing the mixed liquor obtained in the step (2) for several times by high-speed centrifugation with absolute ethanol, then adding absolute ethanol for ultrasonic dispersion, then collecting the supernatant after low-speed centrifugation, and vacuum drying the supernatant to obtain a silicene quantum dots-containing siloxene nanofilm.

2. The method of claim 1, wherein in the step (1), the decalcification organic solvent is at least one of tetraethyl orthosilicate, ethyl acetate, isopropanol, and absolute ethanol; and the transition metal chloride catalyst is at least one of ferric chloride, cobalt chloride, and nickel chloride.

3. The method of claim 1, wherein in the step (1), the molar ratio of $CaSi_2$ to the transition metal chloride catalyst is 1:1 to 1:4.

4. The method of claim 1, wherein in the step (1), the reaction is to stand for 24 to 48 h at room temperature.

5. The method of claim 1, wherein the high-speed centrifugation comprises a rotation speed of 10000 rpm or above and a centrifugation time of 10-15 min.

6. The method of claim 1, wherein in the step (2), the concentration of the hydrochloric acid is 1-4 mol/L, the reaction duration is 3-7 h, and the molar ratio of the added hydrochloric acid to all the added metal elements is greater than 2.

7. The method of claim 1, wherein in the step (3), the washing with absolute ethanol is performed for 3 to 5 times.

8. The method of claim 1, wherein in the step (3), the low-speed centrifugation comprises a rotation speed of 200-500 rpm and a centrifugation time of 3-5 min.

9. The method of claim 1, wherein in the step (3), the vacuum drying is performed under a temperature 60-80° C. for more than 24 h.

10. A silicene quantum dots-containing siloxene thin film, which is prepared by the method of claim 1, wherein:
    the siloxene thin film comprises silicene quantum dots thereon;
    the silicene quantum dots have a size of 2-5 nm;
    the siloxene thin film has a thickness of 1 to 2.5 nm; and
    the thin film is capable of emitting blue fluorescence under the excitation of ultraviolet light source.

11. The silicene quantum dots-containing siloxene thin film of claim 10, the decalcification organic solvent is at least one of tetraethyl orthosilicate, ethyl acetate, isopropanol, and absolute ethanol; and the transition metal chloride catalyst is at least one of ferric chloride, cobalt chloride, and nickel chloride.

12. The silicene quantum dots-containing siloxene thin film of claim 10, wherein in the step (1), the molar ratio of $CaSi_2$ to the transition metal chloride catalyst is 1:1 to 1:4.

13. The silicene quantum dots-containing siloxene thin film of claim 10, wherein in the step (1), the reaction is to stand for 24 to 48 h at room temperature.

14. The silicene quantum dots-containing siloxene thin film of claim 10, wherein the high-speed centrifugation comprises a rotation speed of 10000 rpm or above and a centrifugation time of 10-15 min.

15. The silicene quantum dots-containing siloxene thin film of claim 10, wherein in the step (2), the concentration of the hydrochloric acid is 1-4 mol/L, the reaction duration is 3-7 h, and the molar ratio of the added hydrochloric acid to all the added metal elements is greater than 2.

16. The silicene quantum dots-containing siloxene thin film of claim 10, wherein in the step (3), the washing with absolute ethanol is performed for 3 to 5 times.

17. The silicene quantum dots-containing siloxene thin film of claim 10, wherein in the step (3), the low-speed centrifugation comprises a rotation speed of 200-500 rpm and a centrifugation time of 3-5 min.

18. The silicene quantum dots-containing siloxene thin film of claim 10, wherein in the step (3), the vacuum drying is performed under a temperature 60-80° C. for more than 24 h.

* * * * *